March 31, 1970  R. C. ZELLER ET AL  3,503,287
TOOL AND TOOLHOLDER
Filed March 17, 1967  3 Sheets-Sheet 3
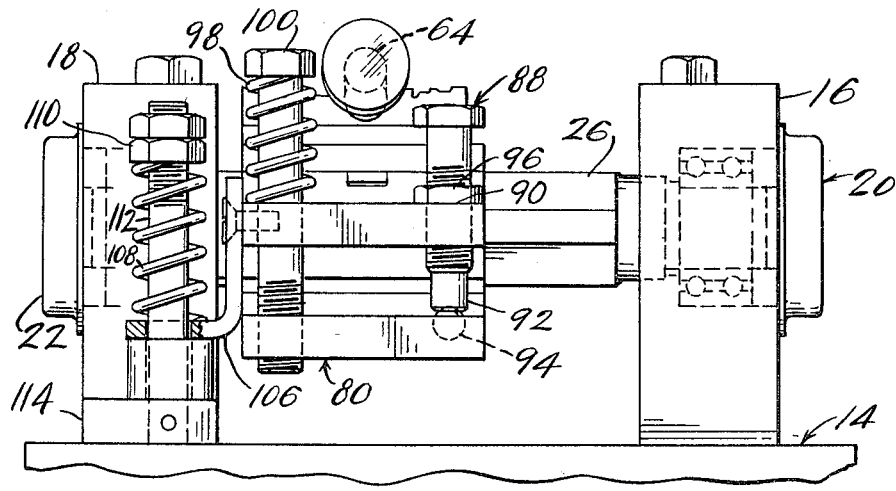
FIG-5-
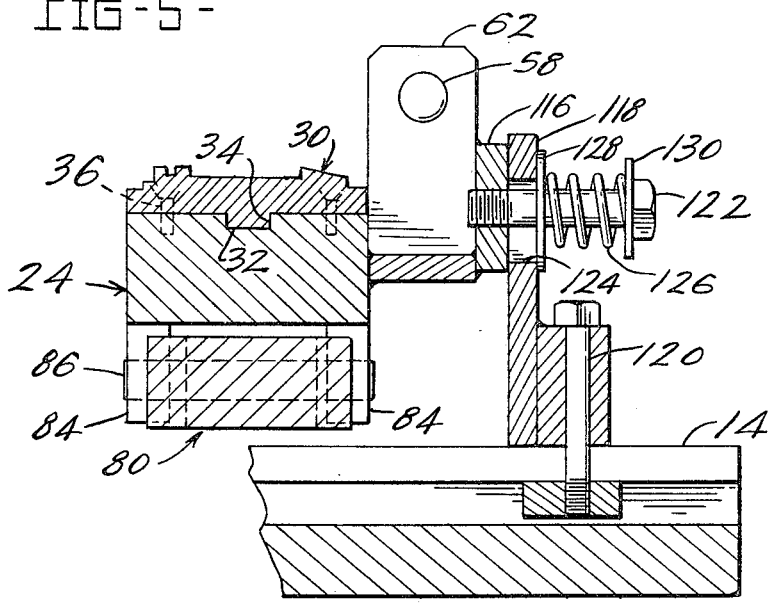
FIG-6-
INVENTORS:
Robert C. Zeller,
Warren W. Weible.
BY
ATT'YS.

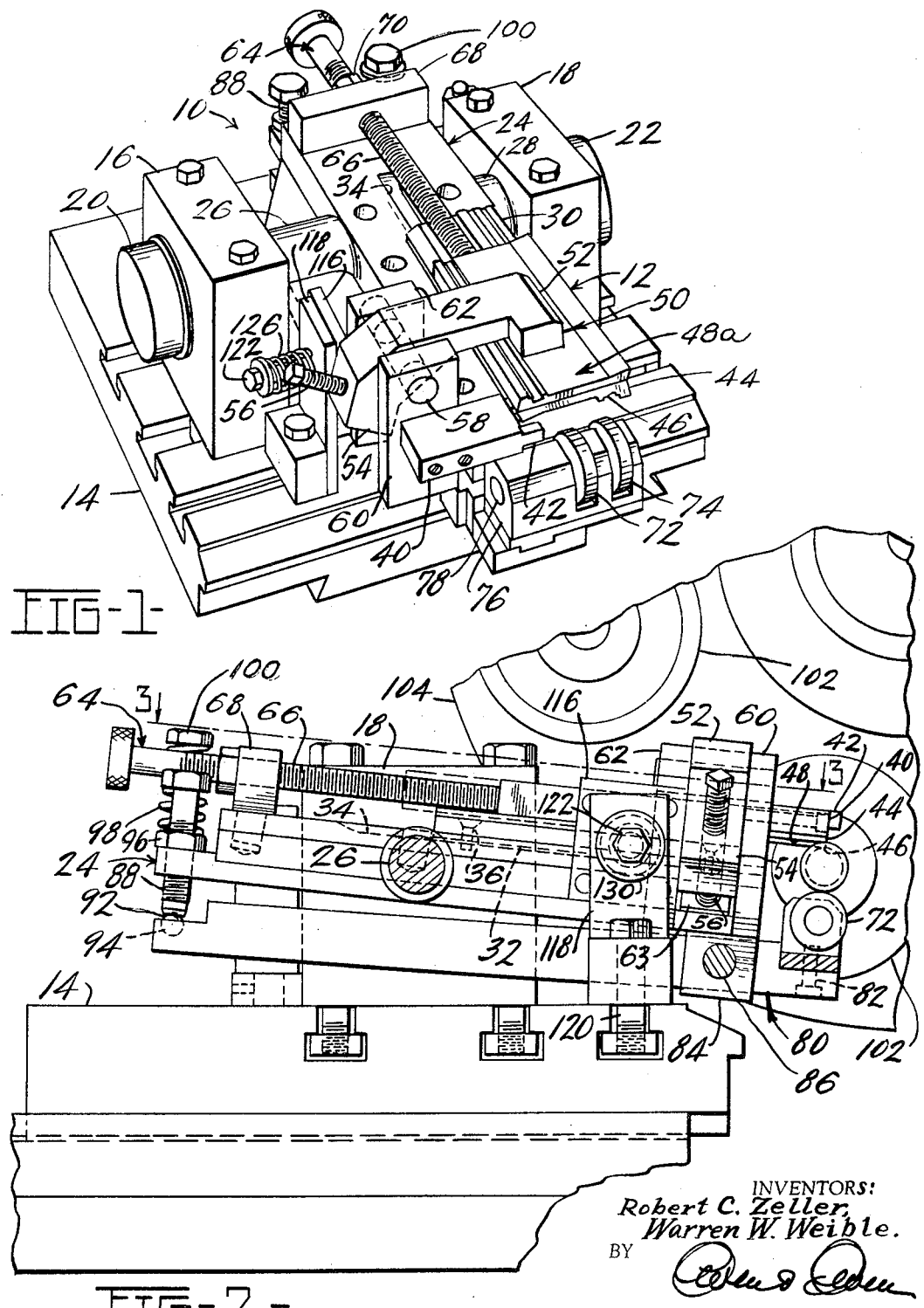

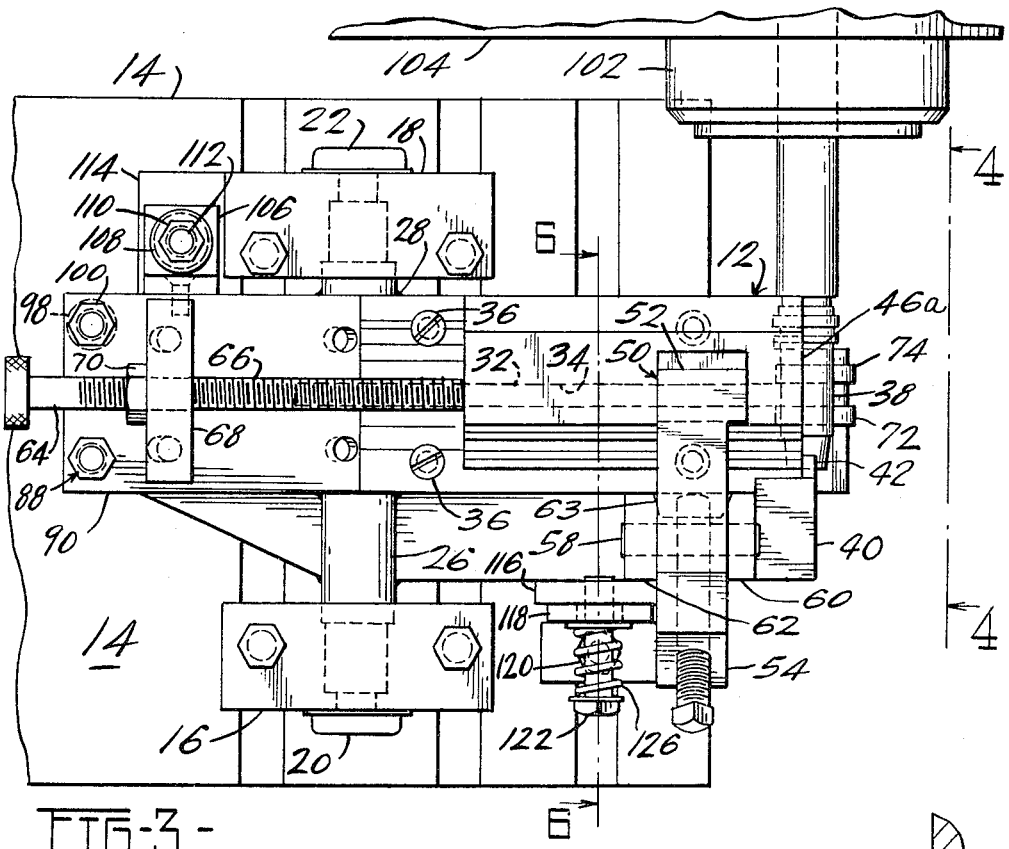
FIG-3-
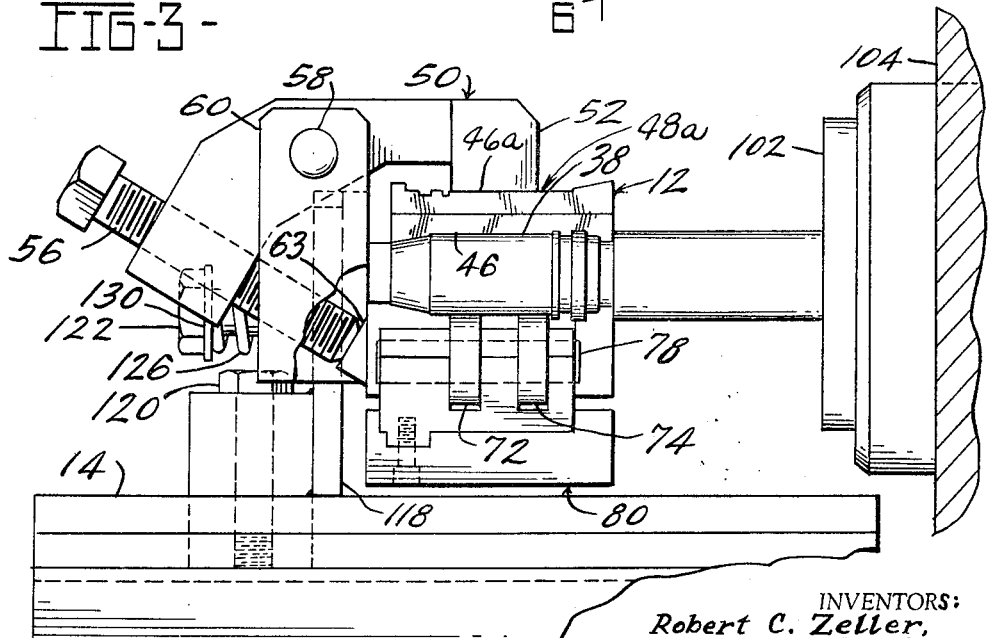
FIG-4-
INVENTORS:
Robert C. Zeller,
Warren W. Weible,
BY
ATT'YS.

United States Patent Office 3,503,287
Patented Mar. 31, 1970

3,503,287
TOOL AND TOOLHOLDER
Robert C. Zeller, 643 Clinton St., and Warren W. Weible, 635 Holgate Ave., both of Defiance, Ohio 43512
Filed Mar. 17, 1967, Ser. No. 623,938
Int. Cl. B23b *29/60, 29/16*
U.S. Cl. 82—35                                         7 Claims

ABSTRACT OF THE DISCLOSURE

The invention is directed to a shave tool and a shave toolholder for cutting and forming machines, e.g. screw machines. The tool has a transverse cross section which is shaped, in part, the same as the piece to be machined so that the tool can be sharpened merely by grinding an end portion thereof. Also, all but a small portion of the tool can be utilized. The toolholder has adjustments for accurately positioning the tool with respect to a workpiece, with all of the adjustments being readily accessible. The toolholder has a contoured surface supporting the tool, with the mating surfaces of the holder and tool positioning the more critical areas of the tool precisely with respect to the workpiece.

BACKGROUND OF THE INVENTION

Shave toolholders heretofore known in the art have had a number of problems. When in operating position in a machine, the means for clamping the tool to the holder and adjustments therefore have been relatively inaccessible, rendering it difficult to replace the tool and to properly adjust the replacement. The known holders also have been susceptible to problems from chips from the machine, causing the holders to jam or the tools to be moved out of adjustment. These holders also have been difficult to adjust accurately so as to maintain the tools within close, desired tolerances. The tools used with the holders heretofore known also have had disadvantages. These tools generally have been held by the holders through dovetails which are expensive to make and machine accurately. The tools also have been of relatively short lengths and, with a relatively long portion of the tool being incapable of use due to the fact that it must be held by the holder, a substantial percentage of the tool is wasted.

SUMMARY OF THE INVENTION

In accordance with the present invention, the new toolholder overcomes the above disadvantages and has a number of additional advantages. The new toolholder is not hindered by chips, having no exposed surfaces which are susceptible to jamming by chips. The new toolholder is also capable of accurately positioning the tool without being thrown out of adjustment by small chips. Further, with the new toolholder, the adjustment for the tool is readily accessible and is capable of precisely adjusting the tool within very small tolerances. The clamping arrangement for holding the tool relative to the toolholder also is readily accessible and can be easily manipulated to tighten, adjust, or remove the tool. The new tool is contoured in a manner such as to provide two cutting edges, both of which can be used before resharpening is required. The new tool also can be substantially longer than those heretofore used and, with the same portion of tool being unuseable, a much smaller percentage of the overall tool is wasted.

It is, therefore, a principal object of the invention to provide an improved toolholder and tool therefor having the advantages outlined above.

Another object of the invention is to provide an improved shave toolholder and shave tool for use with a cutting or forming machine.

BRIEF DESCRIPTION OF THE DRAWINGS

Many other objects and advantages of the invention will be apparent from the following detailed description of a preferred embodiment thereof, reference being made to the accompanying drawings, in which:

FIG. 1 is a view in perspective of a shave toolholder and a tool embodying the invention;

FIG. 2 is a fragmentary left-side view in elevation of the tool and the toolholder of FIG. 1 and showing a portion of a screw machine or other machine with which the tool and toolholder are used;

FIG. 3 is a plan view of the apparatus of FIG. 2;

FIG. 4 is a front view in elevation of the tool and the toolholder shown operating on a workpiece taken along the line 4—4 of FIG. 3;

FIG. 5 is a rear view in elevation of the shave toolholder and tool; and

FIG. 6 is a view in vertical cross section taken along the line 6—6 of FIG. 3, but with the tool and a tool clamp removed.

DESCRIPTION OF THE PREFERRED EMBODIMENT

Referring to the drawings, a shave toolholder embodying the invention is indicated at 10 and includes a shave tool 12 also embodying the invention. The shave toolholder 10 is mounted on a main support or bed 14 of an automatic screw machine, forming lathe, or machine, for example, and can be fed toward and away from a workpiece, preferably with a fast approach feed and a slower rate of feed as the tool engages the work.

A pair of spaced bearing blocks 16 and 18 are mounted on the support 14 and carry enclosed and sealed bearings 20 and 22 and a main toolholder body 24 has outwardly extending bearing arms or shafts 26 and 28 which are rotatably received in the bearings. In this manner, the toolholder body 24 is pivotally moveable in a vertical plane around the bearing arms or blocks. A tool support or adapter 30 is located on the front or tool end of the body 24 and, as shown in FIG. 6, has an extension 32 received in a groove 34 in the body to aid in locating the tool support in the proper position, with the support then affixed to the body by threaded fasteners 36. The upper surface of the tool adapter 30 is complementary at least approximately to the shape of the tool 12 and corresponds to the profile of a product having circular cross sections; being made on the screw machine and being shaved to the final contour by the tool 12 from a workpiece 38.

The tool 12 is held in precise horizontal and vertical position by means of the adapter 30 but can be moved longitudinally thereof. The adapter is designed to cooperate with the cutting surfaces of the tool which produce the most critical areas of the part in such a manner as to ensure precise tool location and interchangeability. Proper selection and design of the mating surfaces will place the tool tolerances at less critical areas of the part being machined, while supporting more critical areas directly, so that tool interchangeability is enhanced over any other method of tool holding now known. To achieve the proper longitudinal positioning, a stop 40 is mounted on the forward or tool end of the holder body 24 and includes a stop tang 42 against which a cutting face 44 of the tool 12 abuts to properly position a cutting edge 46 thereof. The cutting edge 46 is formed by a slanted portion of the face 44 and a major, lower surface 48 fitting with the adapter 30 and contoured to the desired shape of the product. An upper surface 48a of the tool 12 is similarly contoured and cooperates with an upper slanted portion of the opposite face 44 of the tool 12 to form a second cutting edge 46a. In this manner, when the cutting edge 46 has become dull, the tool 12 can be turned over to replace the first cutting edge 46 with the second edge 46a at the upper side to double the service of the tool for a single sharpening operation.

To maintain the tool 12 in position on the adapter 30, a tool clamp 50 is employed. The clamp 50 is of L-shaped configuration, having an upper arm 52 which engages the upper surface of the tool 12 and a lower arm 54 which threadedly receives a clamping screw 56. An intermediate portion of the clamp has a pivot pin 58 located in side supporting bars 60 and 62. The clamping screw 56 extends completely through the lower leg 54 of the clamp and, when turned against a stop face 63 (FIG. 4) of the tool body, forces the lower leg 54 outwardly and the upper leg 52 downwardly against the upper tool surface to securely hold the tool 12 against the adapter 30.

While the clamp 50 maintains the tool 12 on the adapter 30, the longitudinal position of the tool 12 primarily is maintained by a back-up screw 64 which engages the rear face of the tool 12 and maintains the tool against the stop tank 42. To accomplish this, the back-up screw 64 has a thread 66 which extends through a supporting bar 68 of the toolholder body 24 and is maintained in position by a lock nut 70 after being turned against the rear face of the tool.

To position and guide the cutting edge 46 of the tool 12 relative to the workpiece 38, a pair of guide rollers 72 and 74 are located below the tool 12 with the spacing between the cutting edge 46 and the surface of the guide rollers determining the final diameter of the product. The rollers 72 and 74 are rotatably held in a mounting block 76 by an axle 78 with the block 76 mounted on an end of a guide lever 80 by screws 82. The lever 80 extends the full length of the toolholder body 24 and beyond the toolholder end thereof to a position such that the axes of the rollers 72 and 74 will be substantially directly under the cutting edge 46 of the tool. The lever 80 is pivotally carried by the toolholder body 24 and preferably is pivoted near the roller end thereof. For this purpose, a pair of side ears 84 extend downwardly from a forward portion of the toolholder body 24 to pivotally receive a pivot pin or axle 86 extending through the lever 80.

While the lever 80 can be pivoted at any point therealong relative to the toolholder body 24, by placing the pivot toward the tool end, a coarse adjustment of the rear end of the lever provides a fine, precise adjustment for the rollers 72 and 74. To adjust the lever relative to the toolholder body, an adjusting screw 88 (FIG. 5) is located at the end of the body opposite the tool. The adjusting screw 88 is threaded through a rear flange 90 of the toolholder body and has a recessed end 92 which engages a ball stop 94 in the end portion of the lever 80. When the screw 88 is adjusted to the desired position, it is held by a lock nut 96. By employing a fine thread on the adjusting screw 88, and with the leverage provided for the lever 80, extremely close adjustment of the positioning rollers 72 and 74 can be attained, with the central, uniform contact between the recessed end 92 and the ball stop 94 aiding in achieving the fine adjustment. With this arrangement, for example, a one-sixth turn of the screw 88, to move the flats of the hex-head around one position, can change the position of the rollers by only 0.001 inch.

The adjusting screw 88 is maintained against the ball stop 94 under spring pressure by means of a coiled spring 98 extending around a retaining screw 100 and maintained under compression between the head of the screw and the flange 90. The screw 100 is threaded into the end of the lever 80 for this purpose.

Not only does the lever 80 enable the rollers 72 and 74 to be accurately positioned, but the screw 88 also is readily accessible to the operator of the machine for adjustment, unlike the toolholders heretofore known in which any adjustment was obtained through screws located at the tool end of the holder and, further, usually accessible only from below. A resilient material such as a plastic foam (not shown) can be placed in the space between the lever 80 and the toolholder body 24. This prevents the entry of chips which would jam the lever and limit or prevent proper adjustment.

The workpiece 38 is carried by a collet or chuck 102 which is rotated by suitable means (not shown) to rotate the workpiece 38 relative to the tool 12 and other tools located at different stations constituting part of the machine. The chuck and the workpiece are then rotated from station to station by a large rotating member 104, with an appropriate machining operation taking place at each station. Unfortunately, the workpiece is not precisely positioned uniformly at each station so that it is not possible simply to move the shave tool 12 in and out along a fixed path relative to the workpiece to perform the machining operation thereon. In such an instance, if the workpiece were positioned too high, the resulting diameter of the product would be too small, while if positioned too low relative to the tool, the diameter would be too large. Consequently, the toolholder body 24 and the lever 80 along with the tool 12 and the rollers 72 and 74 are pivotally mounted relative to the supporting bed 14 by means of the bearings 20 and 22. Thus, when the rollers 72 and 74 contact the lower portion of the workpiece, they move downwardly along with the tool 12, with the toolholder body 24 pivoting slightly about the axis of the bearings 20 and 22. The toolholder is so positioned that the lower portion of the workpiece will be contacted by the rollers and pivot the tool body and tool regardless of whether the workpiece is stopped slightly above or below the desired position. This will always assure that the rollers do the positioning for the tool and that a constant diameter product, as determined by the spacing between the rollers and tool, will result. When the holder is used in a multiple spindle type machine known in the trade as a screw machine or chucker, versus its application to other machines, it will have a direct improvement on the precision of the finished diameters accomplished due to its ability to compensate for spindle bearing wear and looseness, slide wear, chucking holder alignment and wear, as well as index verification on multiple type machines. In addition, it will automatically compensate for working clearances that are always required in the operating mechanisms of all machine applications due to temperature variations of both thermal contraction and expansion of all materials.

As shown in FIG. 5, the toolholder 10 is maintained with the tool in the upper position by an L-shaped flange 106 fastened to a rear portion of the toolholder body 24 and urged downwardly by a compression spring 108 located between the flange and a pair of seating nuts 110. The nuts 110 are carried by a guide rod 112 which extends upwardly from a mounting body 114 located on the bed 114.

Occasionally, there may be a tendency for the tool to chatter as the toolholder moves toward the work and the rollers 72 and 74 contact the workpiece and pivot the tool 12 downwardly. To prevent this, a pair of friction plates can be used between the support and the toolholder to dampen the movement of the holder and eliminate the chattering. As shown in FIG. 6, a first friction plate 116 moves with the toolholder body 24 while a second friction plate 118 is mounted on the bed 14 by a bolt 120. The plates are urged toward one another by a friction screw 122 threadedly engaged in the plate 116 and extending through a slot 124 in the second plate 118. A compression spring 126 is located between seating washers 128 and 130 and urges the second plate 118 against the first plate 116, with the friction therebetween being controlled by the extent to which the screw 122 is turned into the plate 116 to vary the compression of the spring 126.

From the above, it will be seen that the toolholder 10 and the tool 12 have many advantages over those heretofore known. The toolholder 10 assures accurate positioning of the tool 12 by virtue of the spaced bearings 20 and 22 which position the toolholder body 24 relative to the workpiece. The tool adapter 30 also assures accurate positioning of the tool 12 relative to the body 24 and the clamp 52, with the clamping screw 56 providing ready access for clamping and removing the tool. In addition, there is virtually no possibility that the tool can be jammed by chips resulting from the operation. The arrangement of the lever 80 also provides precise positioning of the rollers 72 and 74 relative to the tool 12 while the rear adjusting screw 88 provides accurate and easily accessible adjustment. The tool 12 itself, capable of being almost any length, reduces the percent of waste thereof, while the end-face arrangement provides two cutting edges, both of which can be used prior to removing and returning the tool to the appropriate location for sharpening. The sharpening operation itself is also simple since the sharpening can be achieved simply by grinding back the end face slightly.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. A shave toolholder assembly for a cutting or forming machine, said assembly comprising supporting means, a pair of spaced bearing blocks on said supporting means, a main toolholder body having outwardly-extending arms at intermediate points thereon pivotally carried by said bearing blocks, a tool adapter on an upper surface of said toolholder body near one end portion thereof, a tool having a lower surface equal in size and shape to a desired product to be made on the machine, and having a slanted end portion cooperating with the lower surface to provide a cutting edge, means for clamping said tool on said adapter, means backing up said tool on said adapter, a guiding lever extending lengthwise of said tool body and extending beyond the tool end thereof, means pivotally connecting said lever to said toolholder body near the tool end, guide means on the end of said lever extending beyond the tool end of said body and located below said tool, adjusting means carried by the toolholder at the end opposite the tool to move said lever in a manner to move said guide means toward and away from said tool.

2. A shave tool asssembly according to claim 1 wherein said backing-up means for said tool comprises a back-up screw extending longitudinally of said tool body and threadedly engaged therewith to contact said tool and support it against longitudinal movement on said adapter.

3. A tool assembly according to claim 1 characterized by stop means carried by said tool body and extending beyond the tool end of said body to contact said tool above said cutting edge to locate said tool in a predetermined position.

4. A shave tool assembly according to claim 1 wherein said adjusting means constitutes a screw threadedly engaged with one of said lever and said toolholder body and engageable with the other of said toolholder body and said lever to position said guide means relative to said tool.

5. A shave tool assembly according to claim 4 characterized by resilient means at the adjusting end of said lever for urging said lever toward said adjusting screw.

6. A shave tool assembly according to claim 1 characterized by a first damping plate carried by said toolholder body, a second damping plate supported on said supporting means, and means urging said damping plates together in frictional engagement to dampen pivotal movement of said tool body.

7. A shave tool assembly according to claim 1 wherein said clamping means comprises an arm, means carried by said toolholder body for pivotally supporting said arm, a threaded rod extending through said arm on the side opposite a clamping end thereof for engaging a supporting face of said tool body to force the associated end outwardly and to force the clamping end against the tool.

References Cited

UNITED STATES PATENTS

| 1,243,989 | 10/1917 | Schulze | 82—35 XR |
| 1,721,729 | 7/1929 | Davenport | 82—35 |

LEONIDAS VLACHOS, Primary Examiner.

U.S. Cl. X.R.

29—95; 82—36